Figure 1:
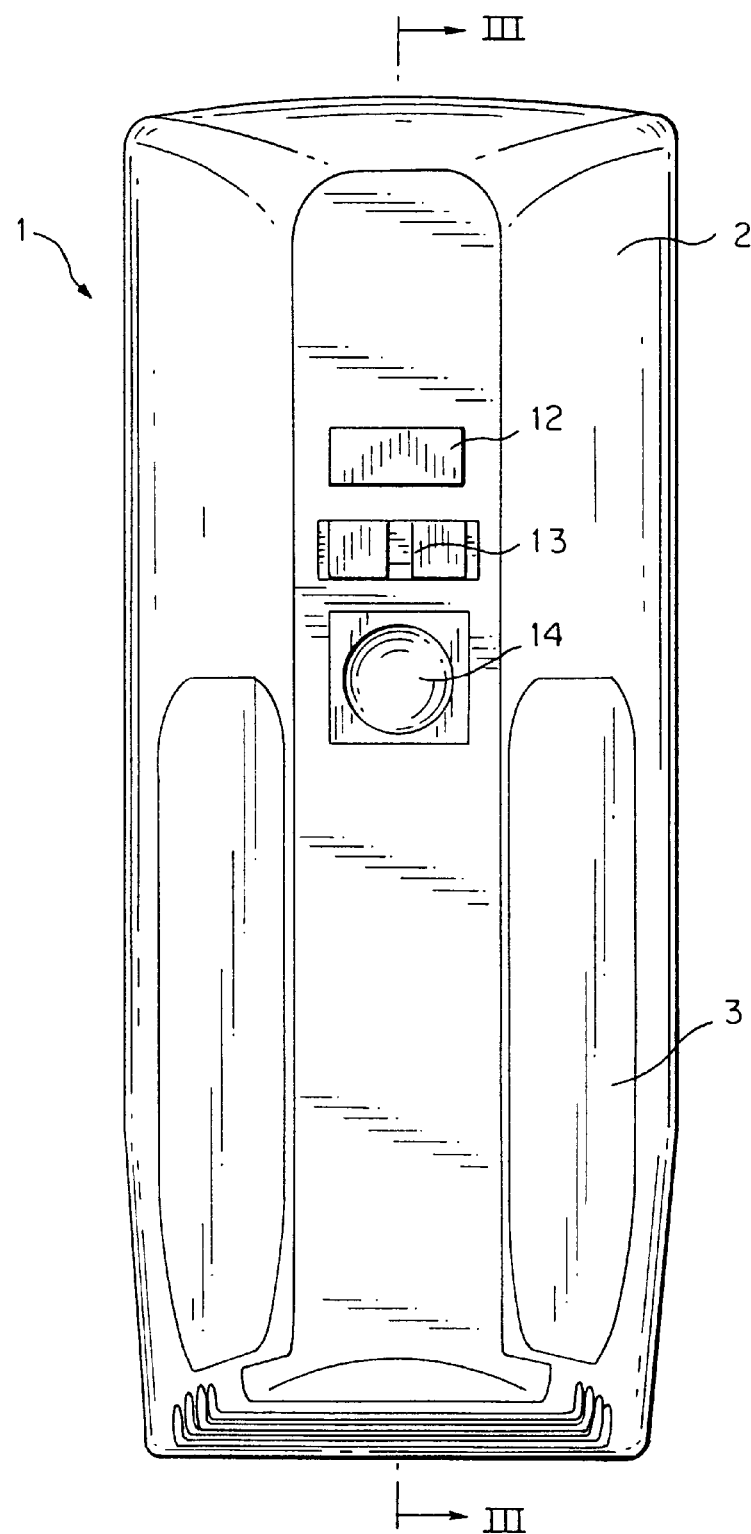

United States Patent [19]

Morch

[11] Patent Number: 6,059,442

[45] Date of Patent: May 9, 2000

[54] HOUSEHOLD MIXING APPLIANCE

[75] Inventor: Mads Morch, Vedbæk, Denmark

[73] Assignee: Ole Bodtcher-Hansen A/S, Taastrup, Denmark

[21] Appl. No.: 08/661,891

[22] Filed: Jun. 12, 1996

[30] Foreign Application Priority Data

Jun. 13, 1995 [DK] Denmark .................................. 0673/95

[51] Int. Cl.⁷ ....................................................... B01F 7/32
[52] U.S. Cl. ............................................. 366/129; 366/301
[58] Field of Search ..................................... 366/129, 197, 366/251, 252, 292, 297, 298, 299, 300, 301

[56] References Cited

U.S. PATENT DOCUMENTS

| | | | |
|---|---|---|---|
| 2,275,878 | 3/1942 | Allenby | 366/292 |
| 2,990,978 | 7/1961 | Charos . | |
| 4,043,909 | 8/1977 | Endo et al. | 366/297 |
| 4,176,971 | 12/1979 | Ernster et al. | 366/298 |
| 4,697,929 | 10/1987 | Muller | 366/298 |

FOREIGN PATENT DOCUMENTS

| | | |
|---|---|---|
| 323759 | 3/1903 | France . |
| 1043011 | 11/1953 | France . |
| 1068640 | 6/1954 | France . |
| 33 46 147 | 7/1985 | Germany . |
| 40 33 020 A1 | 4/1992 | Germany . |
| 2 241 653 A1 | 11/1991 | United Kingdom . |

*Primary Examiner*—Tony G. Soohoo
*Attorney, Agent, or Firm*—Browdy and Neimark

[57] ABSTRACT

The mixing appliance comprises a housing (2) with an electromotor (4), two spindles (9) each adapted to receive a mixing implement (11) in such a way that it is secured against turning but releasable, and a drive connection (7, 8) between the electromotor (4) and the spindles (9), the two spindles (9) and their drive connections (7, 8) being designed such that beaters (11) secured in these spindles (9) during operation are mutually counterrotating and provide between them a flow direction, and such that the areas touched by such beaters during operation overlap each other. The appliance comprises at least one additional spindle (15) for simultaneous, releasable receipt of an additional mixing implement (16) of the same type as the abovementioned mixing implements (11) and a further drive connection (17, 18, 20) for driving a mixing implement (16) in a further spindle (15). The two abovementioned spindles (9) are positioned in two neighbouring corners of a rectangle, within which the additional spindle(s) (15) is/are placed.

7 Claims, 4 Drawing Sheets

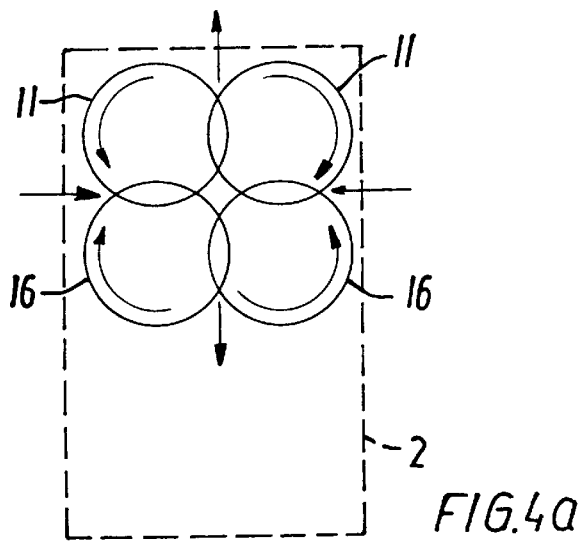
FIG.4a
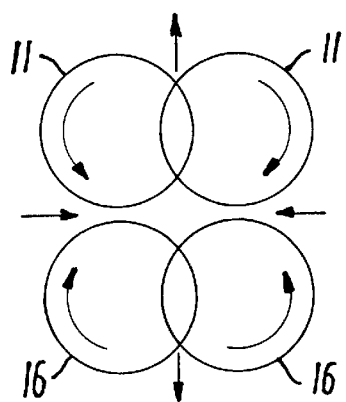
FIG.4b
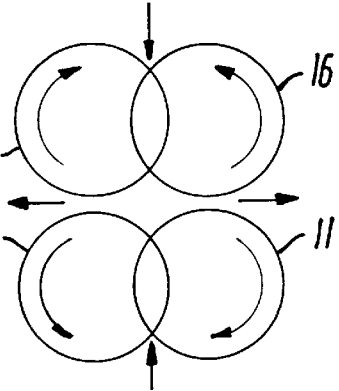
FIG.4c
FIG.4d

HOUSEHOLD MIXING APPLIANCE

The present invention relates to a household mixing appliance, such as a manually operated mixer, comprising a housing with an electromotor, two spindles each adapted to receive a mixing implement in such a way that it is secured against turning but releasable, and a drive connection between the electromotor and the spindles, the two spindles and their drive connections being designed such that beaters secured in these spindles during operation are mutually counter rotating and provide between them a flow direction, and such that the areas touched by such beaters during operation overlap each other.

Household mixing appliances of this type have been known for years and comprise exactly two spindles which are adapted to receive either a pair of dough hooks for mixing a dough or a pair of beaters for whipping for instance whipping cream or egg whites.

Household mixing appliances with three spindles in line is known from U.S. Pat. No. 2,275,878 which relates to a mixer with illumination means, and from FR-B-1 043 011 and FR-B-1 068 640 which both relate to an ejection means for the mixing implements in a mixer.

In U.S. Pat. No. 2,275,878 FIG. 1 shows the three mixing implements placed in such a way in a mixing bowl that the "foremost" one is positioned at the center of the bowl, whereas the "rear" one is positioned at the edge of the bowl. The three mixing implements in line thus seem to be arranged to ensure mixing of all the material in a big bowl. FR-B-1 043 011 and FR-B-1 068 640 merely show three mixing implements arranged in line.

U.S. Pat. No. 4,176,971 discloses a household mixing appliance with four spindles, two of which are rotating slowly and adapted to receive dough hooks, whereas the two other ones are adapted to receive beaters. The spindles are designed such that they can only receive their matching mixing implements (beaters or dough hooks). Furthermore, an ejection means for the mixing implements is designed in such a way that it becomes impossible to mount beaters and dough hooks simultaneously.

Likewise, GB-A-2 241 653 discloses a household mixing machine with four spindles. This machine is a further development of the one described in the above mentioned U.S. Pat. No. 4,176,971, and it is also here intended to use one pair of mixing implements at a time. A part of the development consists in an amended device for retaining the mixing implements, said device comprising a slidably movable plate with locking areas engaging recesses in the shafts of the mixing implements. The plate is spring-urged into a locking position by means of two spring legs and it is rotatable to a limited extent, whereby one mixing implement of a pair may be inserted, and the second mixing implement of the pair may be inserted without thereby releasing the implement first inserted. The possibility of inserting a third or a fourth mixing implement without releasing the previously inserted ones is not mentioned and does not seem to exist.

DE-A-40 33 020 discloses a mixing bowl provided with a mixing mechanism which is pivotally journalled on a central elevation in the bowl and comprises several spindles driven with separate gear and designed to receive different mixing implements. The mixing mechanism has at the top a central inlet shaft for connection with the spindle of a hand mixer. The mixing mechanism has three spindles, which are, however, not used simultaneously.

The object of the present invention is to provide a household mixing appliance of the type mentioned by way of introduction, which appliance gives a more effective mixing or beating than the prior art appliances.

By the term "mixing implements of the same type" is here to be understood for instance beaters or dough hooks which are not necessarily identical in respect of design but which are intended for the same kind of work, for instance beating, mixing or kneading.

In a preferred embodiment the additional drive connection comprises a teething on one of the first mentioned mixing implements and a gear journalled in the housing and engaging a teething on the additional spindle or the additional mixing implement, when the mixing implements are mounted in the respective spindles. Owing to this the additional spindle cannot operate when mixing implements which are only intended to work in pairs are used and which therefore will not be provided with the first mentioned teething.

In a further preferred embodiment one additional spindle is placed such that the three spindles constitute corners in an isosceles triangle, whereby the area touched by a beater mounted in the additional spindle does not overlap the areas touched by the first mentioned beaters, and the additional spindle is preferably placed downstream relative to said flow direction. With this embodiment a reduction of time consumption of approx. 40% when beating egg whites has been ascertained.

The invention will now be explained in the following by means of examples of embodiments with reference to the schematic drawing, in which FIG. 1 shows a hand mixer according to the invention seen from above, FIG. 2 the hand mixer seen from below, FIG. 3 the hand mixer with the housing along the line III—III in FIG. 1, and FIGS. 4a–4f different configurations of four beaters in a hand mixer.

Figure 2:
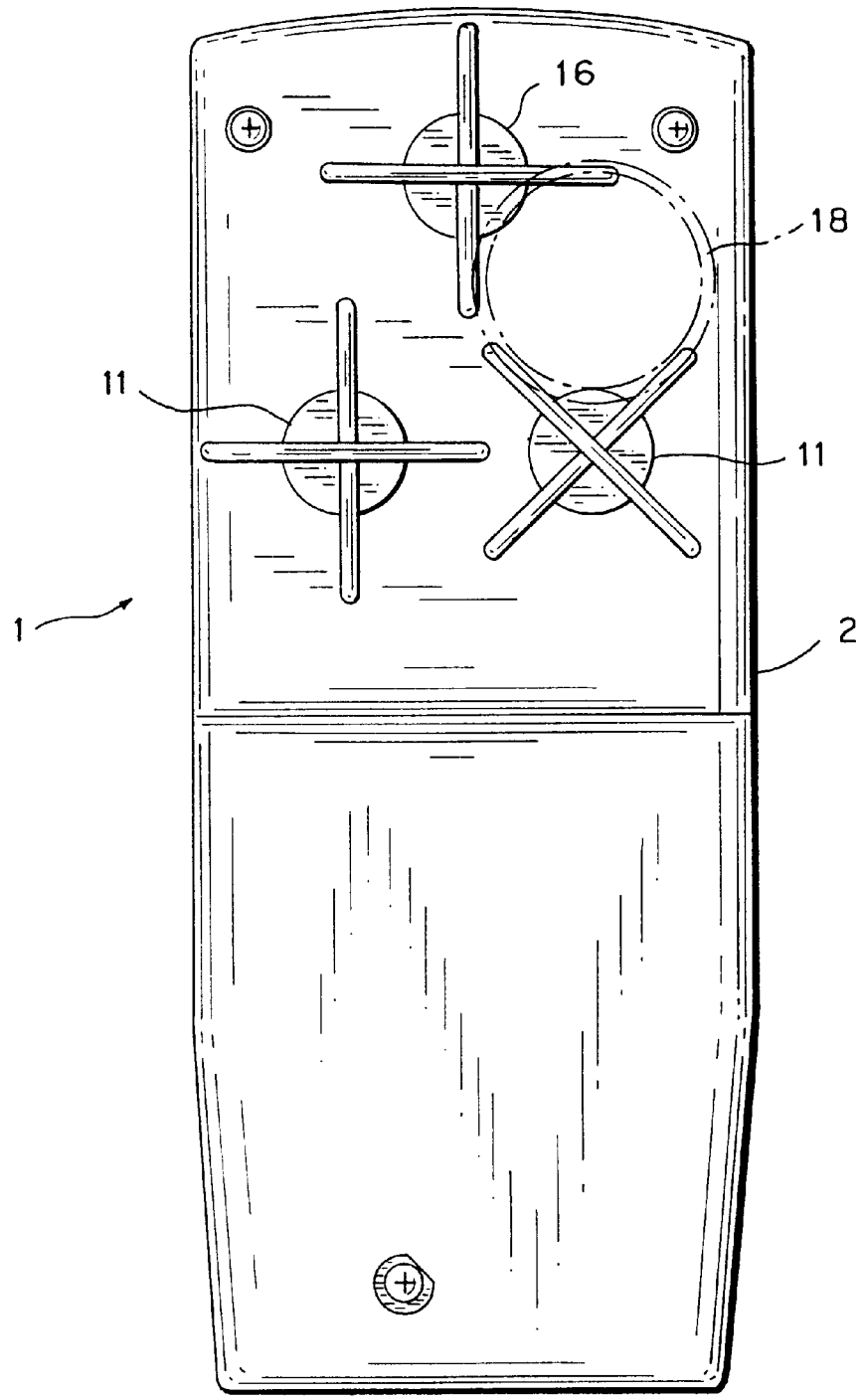
Figure 3:
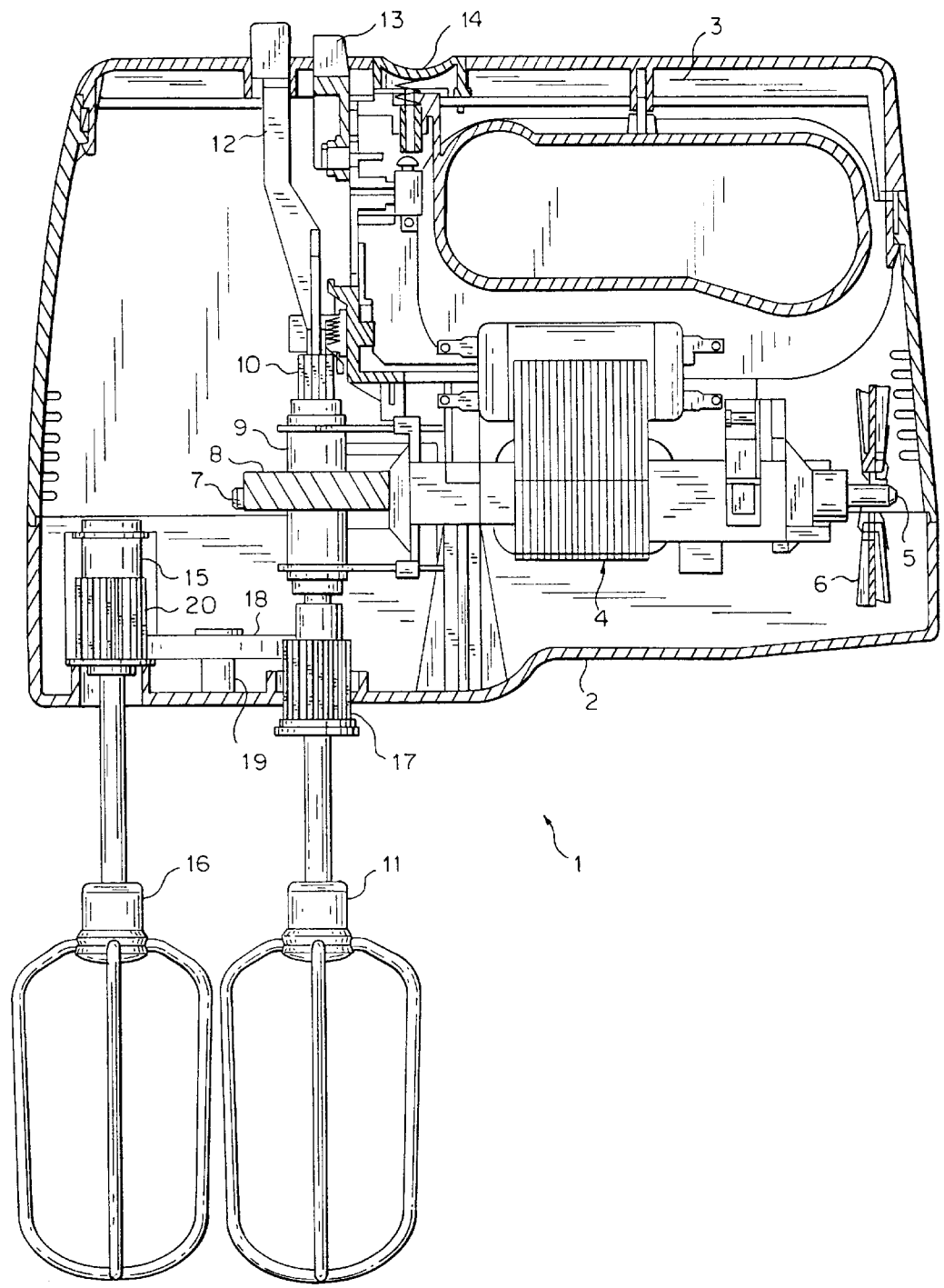

The hand mixer 1 shown in FIGS. 1–3 comprises in a conventional way a housing 2 which has a handle 3 and which holds an electromotor 4 with a through shaft 5 which at one end carries an impeller 6 and at its other end a worm 7 which is in engagement with two gears 8, of which only one is to be seen in FIG. 3, as the second one is positioned behind the first one. The gears 8 are fixedly journalled on each their spindle 9 which is intended, in a way secured against turning, to receive the shaft 10 of a mixing implement which in the example shown is a beater 11. As will be seen from FIG. 2 two such beaters 11 are placed side by side, whereby the areas which are touched by them when they rotate overlap.

The mixing appliance 1 furthermore comprises an ejector 12 for the mixing implements, a speed control with a control knob 13 as well as a switch 14.

As described up till now the mixing appliance 1 is quite conventional. However, it comprises an additional spindle 15 which is positioned in such a way that it constitutes the apex in an isosceles triangle formed by the three spindles 9, 15. The additional spindle 15 is placed so far from the two other spindles 9 that a beater 16 mounted therein does not when rotating overlap the areas touched during operation by the two previously mentioned beaters 11, whereby collision is prevented.

The spindle 15 is driven through one of the first mentioned beaters 11, which on its shaft 10 carries a teething 17 which, when this beater 11 is mounted, is in engagement with a gear 18 journalled on a pin 19 in the housing 2, said gear 18 being furthermore in engagement with a teething 20 on the spindle 15.

In the case shown the teethings 17 and 20 have the same amount of teeth, for which reason the beater 16 will rotate with the same speed as the beaters 11. This is, however, no prerequisite which has to be met.

In spite of the fact that a gear transmission has been described above the invention is not confined thereto. Several other possibilities will be obvious for the one skilled in the art, for instance belt drive, friction wheels instead of gears, drive pinions, etc.

Tests with a hand mixer of the type described above has shown than when beating egg whites a reduction of approx. 40% of the time consumption relative to beating with only two beaters 11 is obtained, whereas when beating whipped cream a slightly smaller reduction of the time consumption is obtained. The configuration shown of the three beaters 11, 16 has the advantage, that the mixing bowl does not have to be significantly bigger than in case of two beaters, the increase of the space demand only being 16% in diameter.

Even though the use of three beaters has been described above, the invention is not confined thereto. Also four beaters might be used, and FIGS. 4a–4d show different ways of configurating four whiskers, the figures showing the areas touched by the individual beaters and the direction of rotation of the beaters. In FIG. 4a the outline of the housing 2 has been indicated by a dotted line and it is to be understood that the housing in the other shown configurations will be positioned in the same way relative to the beaters.

FIG. 4a shows four beaters 11, 16, the areas touched by them during operation overlapping in each case two neighboring areas, whereby material which is being beaten will be pulled in at the sides between two beaters 11, 16 to be sent either forwards or backwards between two beaters 11 and 16 as indicated by arrows.

FIGS. 4b–4d show different possible rotational directions in a configuration, where four beaters are pairwise mutually overlapping. It should be noted that in all the examples shown, the two beaters 11 correspond to the two beaters in a conventional hand mixer, whereas the beaters indicated by 16 are those added according to the invention.

In a variant of the configuration shown in FIG. 2 of the positioning of the mixing implements or the beaters, the beater 16 is laterally displaced, for instance to the right seen in FIG. 2. In such an asymmetric configuration the beater 16 may either rotate clockwise or anticlockwise and may then act as a feeder, if the beaters 11 rotate such that they pull in material from the side, in which the beater 16 is present, or it may act receiver, if the beaters 11 rotate such that they eject material to the side, in which the beater 16 is present, and the beater 16 rotates clockwise as seen in FIG. 2.

I claim:

1. A household mixing appliance comprising:

beaters (11);

a housing (2) with a handle (3);

an electromotor (4) in the housing;

spindles in respective fixed positions in the housing, each of the spindles including means to releasably hold therein one of the beaters (11) and to secure the beater held therein against turning relative to the spindle, the beaters when inserted into respective spindles extending from the housing, the spindles including means for the beaters to be rotatable about respective axes of rotation, the axes all being parallel;

the spindles including a first spindle and a second spindle (9);

the appliance comprising a drive connection (7, 8) connecting the electromotor (4) with the first spindle and the second spindle (9), the drive connection including means for counter rotating the first spindle and the second spindle, wherein the beaters insertable therein provide between them a flow direction;

areas swept by the beaters during rotation in the first spindle and the second spindle overlapping each other;

the spindles including at least one additional spindle (15) for receiving an additional one of the beaters (16);

an additional drive connection (17, 18, 20) driving the additional one of the beaters about an additional axis of rotation;

the axes of rotation of the first spindle and the second spindle being positioned in two neighboring corners of a rectangle perpendicular to said axes of rotation, and the additional axis of rotation being within said rectangle, whereby the axes are disposed in a triangle.

2. The household mixing appliance according to claim 1, wherein the additional drive connection connects the one additional spindle (15) with either one of the first spindle and the second spindle (9).

3. The household mixing appliance according to claim 2, wherein the additional drive connection comprises first teething (17) on one of the beaters (11) of the first spindle and the second spindle, and a gear (18) journalled in the housing (2) and engaging second teething (20) on one of the additional spindle (15) and the beater insertable therein.

4. The household mixing appliance according to claim 6, wherein an additional area swept out the beater in the additional spindle (15) does not overlap with either one of the areas swept by the beaters during rotation in the first spindle and the second spindle (9).

5. A household mixing appliance comprising a housing (2) with an electromotor (4), two spindles (9) in the housing and a drive connection (7, 8) connecting the electromotor (4) and the spindles (9), the drive connection (7, 8) providing for counter rotating the spindles about parallel axes of rotation, each spindle being adapted to releasably receive a mixing implement (11) such that the implement is secured against turning relative to the spindle, wherein implement thus received provide between them a flow direction, areas swept by the implements during an operation thereof overlapping each other, and further comprising an additional spindle (15) for simultaneous, releasable receipt of an additional mixing implement (16) and a further drive connection (17, 18, 20) for driving the additional mixing implement (16) in the additional spindle (15), the additional spindle (15) being placed such that the three spindles (9, 15) constitute corners in an isosceles triangle perpendicular to the axes of rotation, whereby the area swept by a beater (16) mounted in the additional spindle (15) does not overlap the areas swept by the first mentioned beaters (11).

6. The household mixing appliance according to claim 5, wherein the additional spindle (15) is placed downstream from the first mentioned spindles relative to said flow direction.

7. The household mixing appliance according to claim 5, comprising a manually operated mixer.

\* \* \* \* \*